J. B. Holmes,
Elevator.
Nº 2,115.  Patented June 7, 1841.
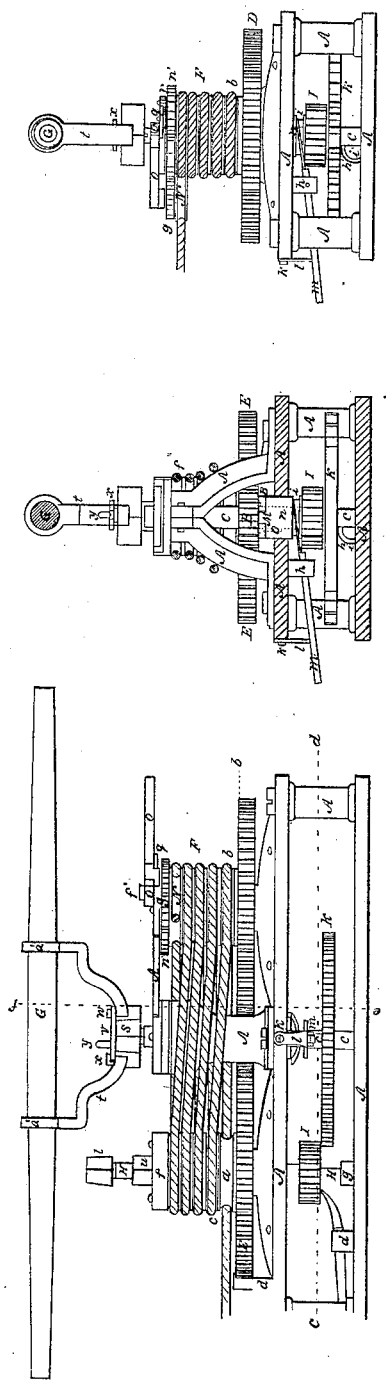
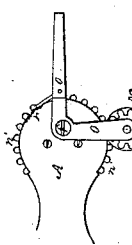
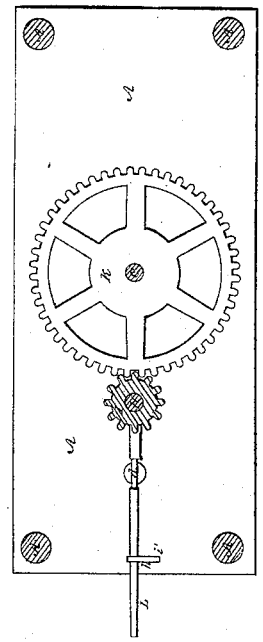
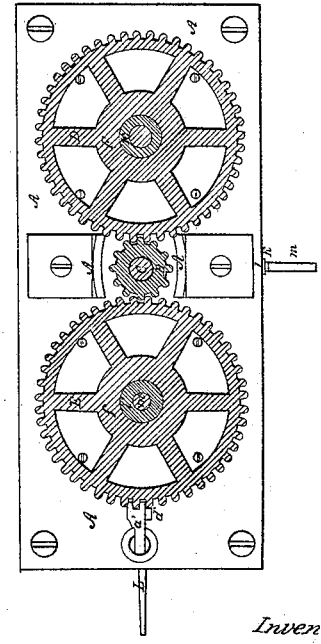
Fig. 1 Front Elevation.
Fig. 2 End Elevation.
Fig. 5 Section on e.f.
Fig. 6 Detail of Roller
Fig. 4 Section on c.d.
Fig. 3 Section on a.b.
Witnesses
Wm. Wiley
Gridley J. F. Bryant
Inventor
John B Holmes

UNITED STATES PATENT OFFICE.

JOHN B. HOLMES, OF BOSTON, MASSACHUSETTS.

IMPROVEMENT IN MACHINERY FOR HOISTING.

Specification forming part of Letters Patent No. 2,115, dated June 7, 1841.

*To all whom it may concern:*

Be it known that I, JOHN B. HOLMES, of Boston, in the county of Suffolk and State of Massachusetts, have invented a new and useful Improvement in Machinery for Hoisting; and I do hereby declare that the following, in connection with the accompanying drawings, is a full and exact description.

The frame-work of the machine is represented at A A A.

H is a circular shaft, which passes through a cylindrical space $m'$ in the upright $k'$, upon which the barrel $f$ revolves. Affixed to this shaft is a cog-wheel I, which, by revolution of the shaft, communicates motion to a larger cog-wheel K. The wheel I may be thrown out of gear with the wheel K by means of the lever L, whose fulcrum is at $d$, which acts on the under side of the wheel I, thereby raising it and the shaft H, connected thereto, which moves freely in the cylindrical space $m'$, above mentioned. During its revolution in connection with the wheel K the wheel I rests upon a shoulder $g$, attached to the frame-work. A bent pin $h'$, inserted in the frame-work at $i'$, revolves laterally therein at $i'$ and serves to hold the lever L while the lever is sustaining the wheel I free from communication with the wheel K. This wheel K is attached to a circular shaft C, which revolves by revolution of the wheel K, and when thrown into connection with the small cog-wheel B communicates motion thereto. The shaft C passes through a circular hole in the wheel B, which is not attached to the shaft; but the shaft revolves without communicating motion to the wheel B, except when thrown into connection therewith by means of an apparatus (shown at Fig. 5) which I describe as follows:

$m$ is a lever whose fulcrum is at $h$. The end of this lever embraces and acts upon a groove $i$ in a circular box $n$, which is connected with the shaft C by means of a key $o$ in such manner that the box $n$ may slide freely up and down on the shaft C, but must always revolve with it, the key $o$ on the shaft corresponding with a groove in the box. The upper part of the box $n$ is formed into a clutch M, which, when the box is raised by means of the lever $m$, passes into corresponding cavities on the under side of the wheel B, and thus the wheel B is brought into connection with the shaft C.

$l$ is a pawl which moves in a vertical plane upon a pin $k$, and is used to hold the lever while the shaft C is in connection with the wheel B. The wheel B, by its revolution, communicates motion to the larger cog-wheels D and E, which wheels and the barrels F $f$, connected therewith, revolve upon cylindrical uprights $k'$ $l'$, attached in the center of the wheels and barrels to the frame-work. These barrels F $f$ are provided with grooves $a\,b\,c$, in which the rope lodges, which is attached to the weight or object to be removed. A part $l$ of the shaft H and a part $s$ of the shaft C have each the shape of a frustum of a pyramid, and there is also attached to the upper surface of the barrel $f$ a similarly-shaped projection $u$, through a cylindrical space in which, as also through a similar space, before mentioned, in the upright around which the barrel $f$ revolves, passes the circular shaft H.

In order to apply the lever G to the different parts of the machine, there is provided a movable brake having arms $t\,t$, in which are rings $u'\,u'$, through which the lever may pass. That part between the arms $t\,t$ incloses a space of the same shape as a transverse section of the parts $l$, $s$, and $u$, before mentioned. The brake, therefore, may be placed at pleasure upon the parts $l$, $s$, and $u$, and by revolving the lever G the shaft H or C or the barrel $f$ revolves therewith.

In order to place the brake $t\,t$ at pleasure upon the part $l$ or the part $u$, there is attached to the brake by a pin $w$ a latch $v$, which revolves laterally on the said pin by means of a handle $y$, and passes under a catch $x$, attached to the brake. When the brake is to be applied to the part $l$, the latch $v$ is placed under the catch $x$, and the brake is upheld by the latch. When it is desired to apply the brake to the part $u$, the latch $v$ is to be removed from the catch $x$, and the brake passes to the part $u$, where it is supported by the upper surface of the barrel $f$. The power may be applied by means of the lever G and brake $t\,t$ or in any convenient manner. Where great power is required, it is to be applied to the shaft H, and then the wheel I must be geared with the wheel K, and the shaft C must be brought into connection with the wheel B. When a less amount of power is required, it may be applied to the shaft C, which must then be connected with the wheel B, but the wheel I need not be geared with the wheel K. When a rapid revolution of the barrels F f is required, the power may be applied to the barrel f by means of the projection u or otherwise. In that case there need be no connection between the wheels I and K nor between the shaft C and the wheel B.

a' represents a toothed pawl, which revolves in a vertical plane upon a pin b', passed through a standard c', which standard is affixed to the frame-work in such manner that it may revolve laterally. A fixed standard d' is provided in the frame-work. When it is desired to hold the wheel E in any given position, the toothed pawl is suffered to fall behind the standard d' into contact with the wheel E in such manner that a tooth of the wheel E shall coincide with the space between the teeth of the pawl. The standard d' then prevents the motion of the pawl and of the wheel backward, and if it be desired to give the wheel a motion forward the teeth of the wheel, acting upon the teeth of the pawl, will cause it to revolve by means of the revolving standard c', and thus allow the wheel E a free motion.

When the machine is in operation, a rope passes from the weight to the groove a at one extremity of one of the barrels or capstans, touching this groove as a tangent, thence to corresponding groove b on the other barrel, thence round a semi-circumference of the same to the next groove c in order on the opposite barrel, and so on, till it passes from the last groove. At this last stage of the operation it has been usual to employ one or more men to hold the rope in a proper state of tension while in the progress of delivery from the barrel. It is my purpose to dispense with this constant attendance by means of a grooved roller, as in the following description, which is most clearly illustrated in Fig. 6.

N is a grooved roller, which revolves in the end of a bent lever O by means of a pin e', by which it is attached to the lever. The fulcrum of the lever O is at f', where it is attached to the frame-work of the machine. To the handle of the lever O is attached a spring-pawl q, which falls into the teeth of a ratchet r and serves to press the roller N into close contact with the rope as it passes between the roller and the barrel on its departure therefrom. This pressure may be effected by means of the lever O, as above described, or in any other convenient manner. The roller may be made to turn entirely by the friction of the rope, or it may be provided, as represented in the drawings, with a toothed wheel g', attached to the roller and whose axis is the axis of the roller, and the said toothed wheel g' shall be set in motion by a toothed circumference n' of the barrel F. In this manner the rope is held in a state of tension and prevented from any slipping which might be occasioned by the action of the weight at the other end, being the office formerly performed by the constant attendance of one or more men.

The machinery, except the grooved roller N and apparatus connected therewith, is not new; but the machinery at present in use has an outside framing which interferes with the operation of replacing the rope upon the barrels, making it necessary to draw the whole rope and producing many revolutions of the barrels and machinery connected therewith, occupying nearly as much time as the actual process of hoisting, a disadvantage which makes the machines as at present formed very objectionable and nearly useless, as this inconvenience recurs every time that it becomes necessary to place the rope upon the barrels. In my improvement I have dispensed with the above-mentioned framing and am enabled to place or displace the whole rope in an expeditious manner by throwing the several courses over the top of the barrels. The machinery therefore, except the grooved roller N, I do not claim; but What I do claim as my invention and improvement, and desire to secure by Letters Patent, is—

1. The arrangement of the barrels which hold the rope without an outside framing, as herein described.

2. The combining therewith in the manner set forth a grooved roller N, to press the rope against the barrel on its passage therefrom for the purpose of preventing any slipping of the rope which the action of the weight at the other end has a tendency to produce, being constructed and operating as herein described.

In testimony that the above is a true description of my invention and improvement I have hereunto set my hand this 26th day of March, A. D. 1841.

JOHN B. HOLMES.

Witnesses:
 GRIDLEY I. F. BRYANT,
 WM. WILEY.